A. A. NAVILLE & P. A. & C. E. GUYE.
METHOD AND APPARATUS FOR PRODUCING CHEMICAL REACTIONS IN A MASS OF GASES.
APPLICATION FILED SEPT. 28, 1906.
1,035,723.  Patented Aug. 13, 1912.
Fig. 1ᵃ
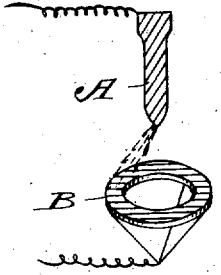
Fig. 2ᵃ
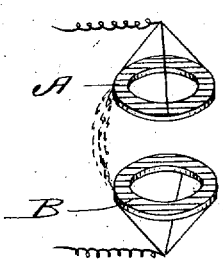
Fig. 3ᵃ
Fig. 1ᵇ
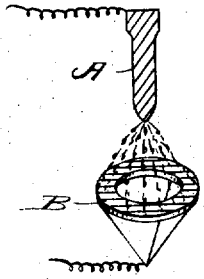
Fig. 2ᵇ
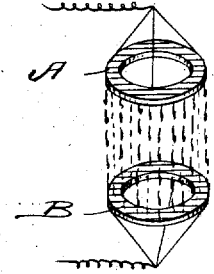
Fig. 3ᵇ
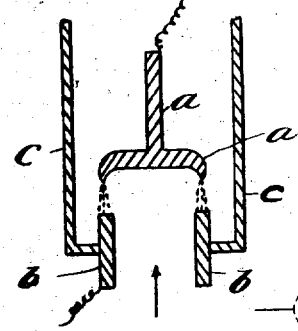
Fig. 5
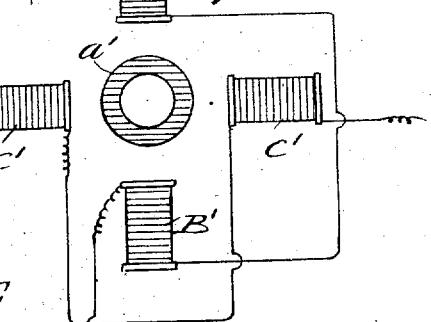
Fig. 4
Fig. 6
Witnesses:
C. B. Kesler
Robert Emmett
Inventors:
Aloys A. Naville
Philippe A. Guye
Charles E. Guye
James L. Norris
Atty.

UNITED STATES PATENT OFFICE.

ALOYS ADRIEN NAVILLE, PHILIPPE AUGUSTE GUYE, AND CHARLES EUGENE GUYE, OF GENEVA, SWITZERLAND, ASSIGNORS TO SOUTHERN POWER COMPANY, OF NEW YORK, N. Y.

METHOD AND APPARATUS FOR PRODUCING CHEMICAL REACTIONS IN A MASS OF GASES.

1,035,723.  Specification of Letters Patent.  Patented Aug. 13, 1912.

Application filed September 28, 1906. Serial No. 336,628.

*To all whom it may concern:*

Be it known that we, ALOYS ADRIEN NAVILLE, PHILIPPE AUGUSTE GUYE, and CHARLES EUGENE GUYE, citizens of Switzerland, residing at 3 Chemin des Cottages, Geneva, Switzerland, have invented certain new and useful Improvements in Methods and Apparatus for Producing Chemical Reactions in a Mass of Gases, of which the following is a specification.

The electric arc is used for effecting chemical reactions in a mass of gases, for instance the combination of nitrogen with oxygen. It is essential that the gas which has been subjected to the action of the arc should be immediately removed from this action, gas being substituted which has not been acted upon. The apparatus which forms the subject matter of the present invention is designed to realize this essential by communicating to a continuous current arc a rapid rotation by means of a rotary magnetic field, and has been patented in countries foreign to the United States as follows: France, No. 361,827, dated Nov. 3, 1906; application filed Oct. 7, 1905; addition No. 5805, dated November 21, 1905. Austria, No. 34,638, dated May 15, 1906; application filed July 20, 1906. Great Britain, Patent No. 21,338, of 1906, dated August 15, 1907, application filed Sept. 26, 1906.

Figure 1$^a$ is a vertical section illustrating the manner in which an arc is deflected during its rotation, the electrodes of the apparatus shown being rectilinearly straight. Fig. 2$^a$ is a view of the apparatus partially in section and partially in perspective showing one electrode rectilinearly straight and the remaining electrode circular. Fig. 3$^a$ shows a further change in the apparatus, wherein both electrodes are circular, the electrodes being in perspective. Figs. 1$^b$, 2$^b$ and 3$^b$ show views of the apparatus respectively similar to those disclosed by Figs. 1, 2$^a$ and 3$^a$, and illustrate corresponding variations in the appearance of the arc when set in rotation by the rotary magnetic field. Figs. 4 and 5 represent views of further modifications. Fig. 6 is a horizontal section, otherwise corresponding to Fig. 1$^a$, and showing the arc at one point of its rotation.

According to the type of electrodes A and B, Figs. 1$^a$ to 3$^b$, both inclusive, the form of the arc will be more or less varied, the appearance of the arc being either that of a sphere more or less elongated (Fig. 1$^b$) or that of a cone (Fig. 2$^b$), or that of a cylinder (Fig. 3$^b$).

Fig. 4 shows a form of the invention in which the rotary field is constituted by two systems of rectangular electro-magnets, B' and C', electrically coöperating with an interposed element A', and energized by two-phase currents; it is evident that the rotary field may be produced in any manner by polyphase currents with aid of any of the numerous arrangements that are used in electrical engineering, particularly in the construction of rotary field motors.

The modification shown in section in Fig. 5, represents a type of furnace having especially advantageous electrodes. The upper one $a$ is a disk having a downwardly extending rim, or it may be a cone. The lower electrode $b$ is a tube which serves as a duct for introducing gases. The whole is inclosed in a narrow chamber $c$ of insulating and refractory material. By suitably adjusting the flow of the gases, these meet the arc as it is in rapid rotation. The speed of the rotation of the arc depends on the frequency of the current and to a certain degree on the power of the rotary field.

The object in view can be attained equally well by using alternating current arcs. The apparatus is identical with that described above except that the arc, instead of being fed by a continuous current, is fed with an alternating current of which the periodicity may be the same as or different from that of the rotary field. In the latter case it is easy, as has been experimentally ascertained, to insure that the arc shall have a rotary movement more or less rapid. For instance, supposing that the periodicity of the arc current is the same as that of the rotary field current, and that Figs. 1$^a$ and 6 are an elevation and plan respectively of the position of the arc. In Fig. 1$^a$, E E represent the electrodes and H the arc. Under these conditions the arc will tend to describe a semi-circle B A B' during the first half period and will return in the reverse direction B' A B during the second half period.

In other words, it will oscillate around the position A, which may conveniently be termed the "principal position."

Assuming now that the periodicity $n$ of the rotary field and the periodicity $n'$ of the arc differ by a small amount, at each half period there will be produced an advance or a retardation and the principal position A will be displaced in one direction when $n'$ is greater than $n$ and in the reverse direction when $n'$ is less than $n$. The principal position A will rotate at first slowly if the difference $n'-n$ is small, but the rotation will increase in speed within certain limits the more rapidly the greater the difference in periodicity between the rotary field and the arc current. In this arrangement the arc has not only a continuous rotary movement determined by the difference of periodicity $n'-n$ but an oscillation of greater or less amplitude around the principal position in proportion as this is displaced. This two-fold effect is particularly favorable to the production of chemical reactions in the gases by the action of the electric arc.

It is to be noted that in all the apparatus shown in the drawings the arc produced is at an angle less than ninety degrees with the plane of rotation of the arc.

While we have described the best form of our invention now known to us, it is obvious that our invention may be given many forms by those skilled in the art without departing in anywise from its generic scope. We, therefore, desire to cover in the annexed claims all of the forms which our invention may be given.

Having thus described the nature of our said invention and the best means we know of carrying the same into practical effect, we claim:—

1. An apparatus for producing chemical reactions in fluids, comprising spaced electrodes, said electrodes being of a relative shape, such that an arc struck between them will lie at an angle of less than 90° to the axis of the electrodes, means for maintaining the arc between said electrodes, and magnetic means for rotating said arc, whereby said arc in its rotation defines a solid figure, and means for introducing fluid at the base of said figure and passing it through the zone traversed by said arc.

2. An apparatus for producing chemical reactions in a mass of gases, consisting in means for forming and causing an alternating electric arc to play in the said mass, producing an alternating rotary magnetic field having a frequency different from the frequency of said arc, and subjecting said arc to the influence of said magnetic field.

3. An apparatus for producing chemical reactions in a mass of gases, consisting of an alternating electric arc with a coöperating rotary field for correspondingly moving the said arc, and means for feeding the rotary field and arc with currents of different periodicities.

4. An apparatus for producing chemical reactions in a mass of gases, consisting of electrodes for forming an electric arc and causing the latter to play in the mass of gases, and a stationary source of magnetism for producing a rotary magnetic field to which the said arc is subjected and causing the arc to rotate in one plane about the axis of one of the electrodes.

5. An apparatus for producing chemical reactions in a mass of gases, consisting of means for forming an arc having a constant length and causing the latter to play in a mass of gases which move in relation to the arc and continually replace portions thereof which have been acted upon by the arc, and a rotary magnetic field to the action of which said arc is subjected to rotate the arc.

6. The method or process of rotating electric arcs or electric discharges which consists in establishing an alternating current electric arc, rotating said arc by means of a rotary magnetic field supplied with alternating current having a frequency different from the frequency of the current supplied to said arc, and passing a current of gas past and in contact with the said arc.

7. The method of bodily rotating an electric arc in a mass of fluid which consists in establishing a rotary magnetic field in the path of the fluid, and striking and maintaining the arc at an angle to the plane of rotation of said field.

8. The method of rotating bodily an electric arc in a mass of fluid, which consists in establishing the arc between electrodes having extended arcing surfaces and an open space between said surfaces in which said arc can move in a circuit, and establishing a rotary magnetic field in a plane at an angle to said arc.

9. The method or process of deviating electric arcs or electric discharges, which consists in establishing an electric arc of constant length, creating a rotary magnetic field to influence and rotate the said arc, and passing a continuous current of gas past and in contact with the said arc.

10. The method or process of deviating electric arcs or electric discharges, which consists in establishing an alternating current electric arc of constant length, influencing and rotating the said arc by means of a rotary magnetic field supplied with an alternating current, and passing a continuous current of gas past and in contact with the said arc.

11. The method or process of deviating electric arcs or electric discharges, which consists in establishing an electric arc having a constant length by means of an alternating current, rotating the said arc by means of a rotary magnetic field supplied with an alternating current of different periodicity from that of the current used to feed the arc, and causing a current of gas to continually pass and be brought in contact with the said arc.

12. The process of producing chemical reactions in a mass of gases which consists in producing an electric arc in said mass and subjecting said arc to the action of a magnetic field which gives it an oscillatory rotation.

In testimony whereof we have hereunto set our hands in presence of two subscribing witnesses.

ALOYS ADRIEN NAVILLE.
PHILIPPE AUGUSTE GUYE.
CHARLES EUGENE GUYE.

Witnesses:
L. H. MUNIER,
EMILE HENRY REH.